(12) United States Patent
Ono

(10) Patent No.: US 10,095,439 B2
(45) Date of Patent: Oct. 9, 2018

(54) TIERED STORAGE SYSTEM, STORAGE CONTROLLER AND DATA LOCATION ESTIMATION METHOD

(71) Applicants: KABUSHIKI KAISHA TOSHIBA, Tokyo (JP); TOSHIBA SOLUTIONS CORPORATION, Kawasaki-shi, Kanagawa (JP)

(72) Inventor: Yasuhiro Ono, Tokyo (JP)

(73) Assignees: Kabushiki Kaisha Toshiba, Tokyo (JP); Toshiba Solutions Corporation, Kawasaki-shi, Kanagawa (JP)

(*) Notice: Subject to any disclaimer, the term of this patent is extended or adjusted under 35 U.S.C. 154(b) by 86 days.

(21) Appl. No.: 15/228,554

(22) Filed: Aug. 4, 2016

(65) Prior Publication Data

US 2016/0342364 A1    Nov. 24, 2016

Related U.S. Application Data

(63) Continuation of application No. PCT/JP2014/070180, filed on Jul. 31, 2014.

(51) Int. Cl.
*G06F 3/06* (2006.01)
*G06F 12/00* (2006.01)

(52) U.S. Cl.
CPC ............ *G06F 3/0647* (2013.01); *G06F 3/061* (2013.01); *G06F 3/0611* (2013.01); *G06F 3/0683* (2013.01); *G06F 3/0685* (2013.01); *G06F 12/00* (2013.01)

(58) Field of Classification Search
None
See application file for complete search history.

(56) References Cited

U.S. PATENT DOCUMENTS

| | | | |
|---|---|---|---|
| 5,893,139 A * | 4/1999 | Kamiyama | ........... G06F 12/122 711/113 |
| 7,392,356 B1 | 6/2008 | Hardman | |
| 2006/0107016 A1 | 5/2006 | Murotani et al. | |
| 2007/0277011 A1 | 11/2007 | Tanaka et al. | |
| 2008/0077737 A1 | 3/2008 | Nakase et al. | |

(Continued)

FOREIGN PATENT DOCUMENTS

| | | |
|---|---|---|
| JP | 2003-108317 | 4/2003 |
| JP | 2006-24024 | 1/2006 |

(Continued)

*Primary Examiner* — Kaushikkumar Patel
(74) *Attorney, Agent, or Firm* — Finnegan, Henderson, Farabow, Garrett & Dunner, L.L.P.

(57) ABSTRACT

According to one embodiment, a tiered storage system includes first and second storage devices having access speeds different from each other, and a storage controller. The storage controller manages first and second access frequency statistical values. The first access frequency statistical value corresponds to a state in which data of a respective one of logical chunks is located on the first storage device, and the second access frequency statistical value corresponds to a state in which data of the respective one is located on the second storage device. The storage controller determines whether it is necessary to change the location state of the data of the respective one, based on the first and second access frequency statistical values of the respective logical chunks.

17 Claims, 8 Drawing Sheets

(56) References Cited

U.S. PATENT DOCUMENTS

| | | | |
|---|---|---|---|
| 2010/0095164 A1 | 4/2010 | Kamei et al. | |
| 2010/0274826 A1 | 10/2010 | Takata et al. | |
| 2010/0306464 A1* | 12/2010 | Dawkins | G06F 3/0605 711/114 |
| 2011/0093670 A1* | 4/2011 | Cherian | G06F 3/0613 711/156 |
| 2013/0024634 A1 | 1/2013 | Shitomi | |
| 2013/0080703 A1* | 3/2013 | Kumagai | G06F 9/5072 711/117 |
| 2014/0108759 A1* | 4/2014 | Iwamitsu | G06F 3/0604 711/165 |
| 2014/0297909 A1* | 10/2014 | Aiura | G06F 3/0608 710/74 |
| 2014/0297964 A1 | 10/2014 | Nakase | |
| 2014/0325121 A1* | 10/2014 | Akutsu | G06F 3/0604 711/103 |

FOREIGN PATENT DOCUMENTS

| | | |
|---|---|---|
| JP | 2006-139552 | 6/2006 |
| JP | 2007-316995 | 12/2007 |
| JP | 2008-83922 | 4/2008 |
| JP | 2008-158661 | 7/2008 |
| JP | 2010-97359 | 4/2010 |
| JP | 2010-257094 | 11/2010 |
| JP | 2012-27934 | 2/2012 |
| JP | 5362145 | 9/2013 |
| WO | WO 2011/076565 A1 | 6/2011 |
| WO | WO 2013/014694 | 1/2013 |
| WO | WO 2014/155666 A1 | 10/2014 |

* cited by examiner

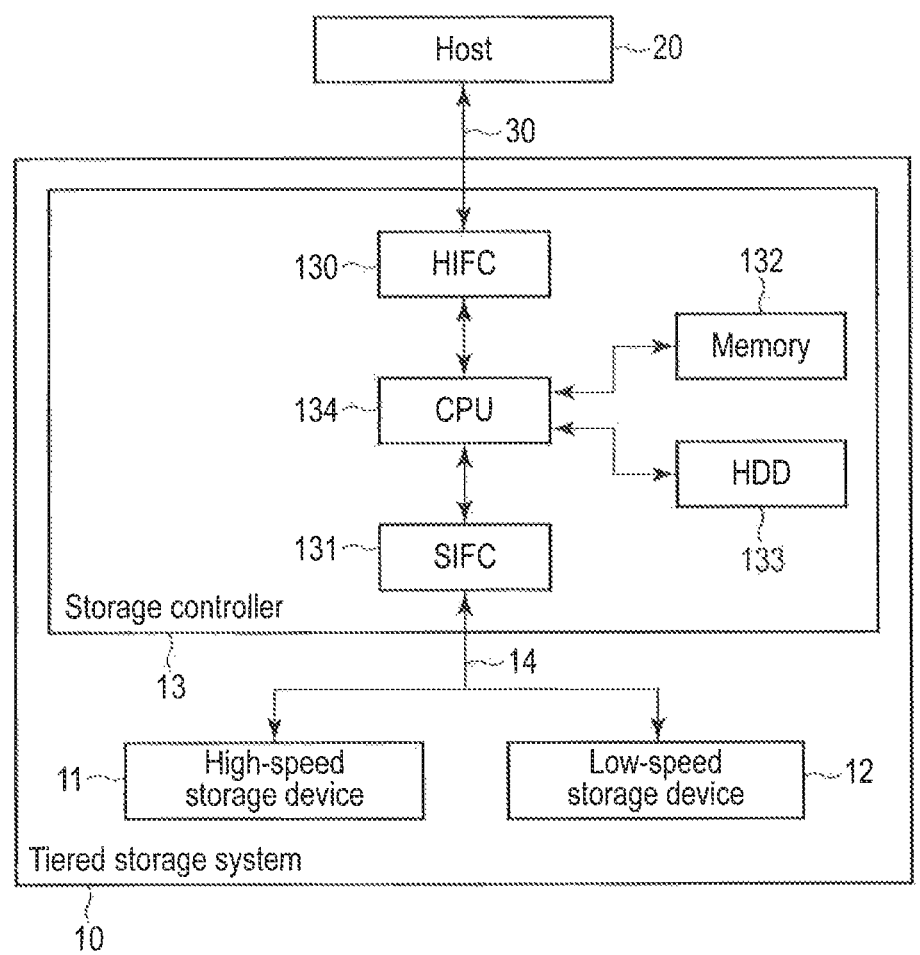
F I G. 1

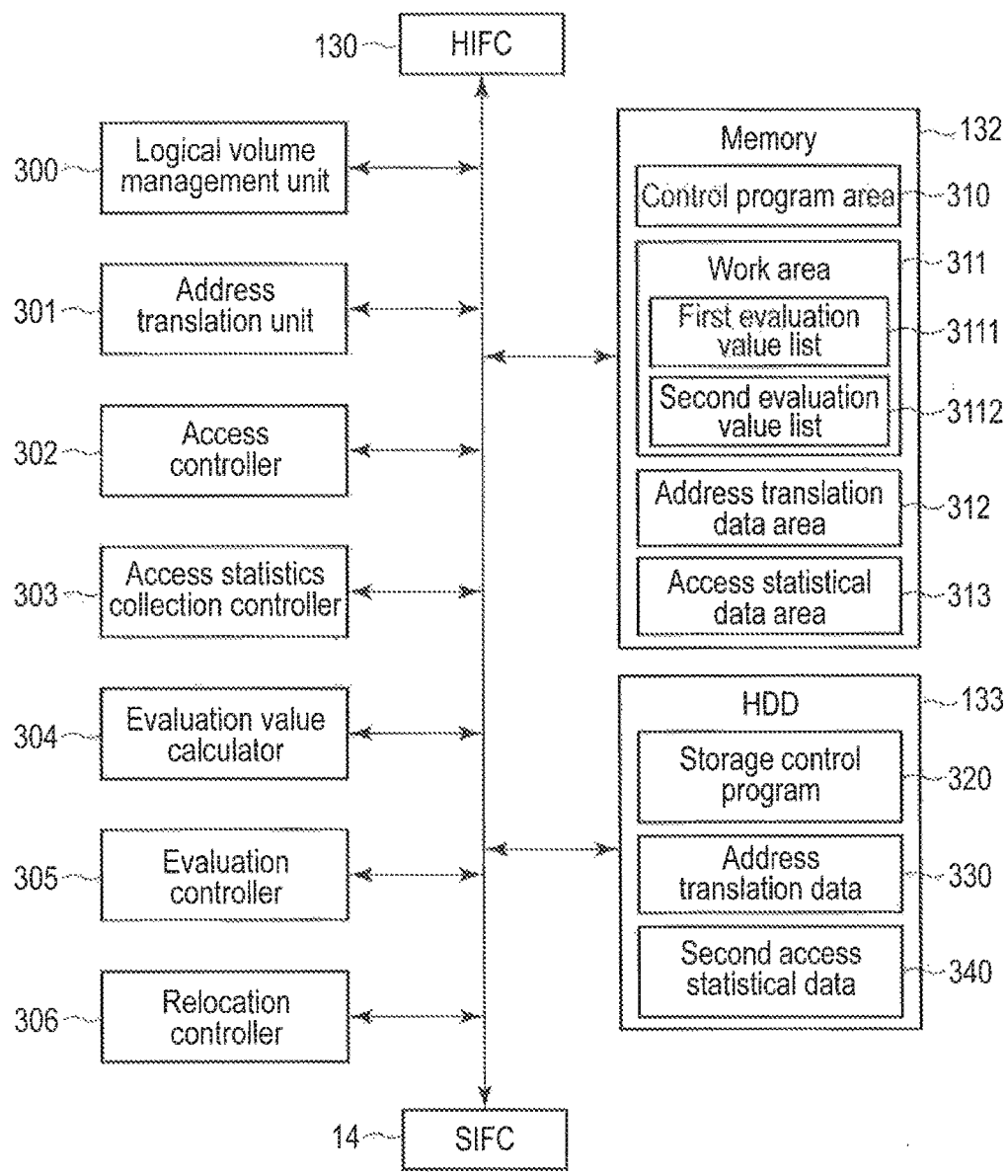
F I G. 3

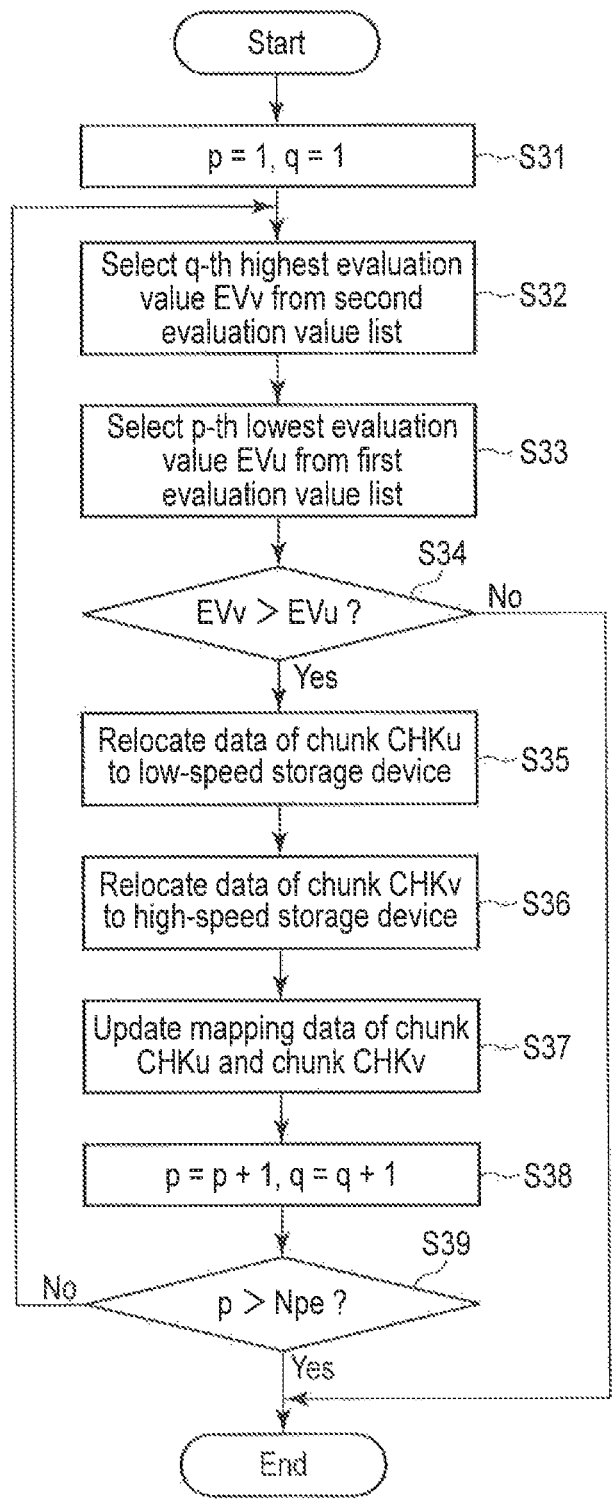
F I G. 9

TIERED STORAGE SYSTEM, STORAGE CONTROLLER AND DATA LOCATION ESTIMATION METHOD

CROSS-REFERENCE TO RELATED APPLICATIONS

This application is a Continuation Application of PCT Application No. PCT/JP2014/070180, filed Jul. 31, 2014, the entire contents of which are incorporated herein by reference.

FIELD

Embodiments described herein relate generally to a tiered storage system, a storage controller and a data location estimation method.

BACKGROUND

A storage system including a first storage device and a second storage device that have different access speeds has recently been developed. Assume here that the access speed and storage capacity of the first storage device are high and small, respectively, and that the access speed and storage capacity of the second storage device are lower and greater than chose of the first storage device, respectively. The storage system is realized by hierarchically combining the first storage device (hereinafter, referred to as a high-speed storage device) and the second storage device (hereinafter, referred to as a low-speed storage device). Therefore, this storage system is also called a tiered storage system. In the tiered storage system, the high-speed and low-speed storage devices are generally positioned as upper and lower tiers, respectively.

Further, in recent years, in most storage systems, virtualization of a storage area has grown popular. The same can be said of tiered storage systems. In such tiered storage systems, at least parts of the storage areas (hereinafter, referred to as physical volumes; of the high-speed and low-speed storage devices are allocated (i.e., mapped) to a logical volume.

In the tiered storage system, the logical and physical volumes are each divided for management into a plurality of small areas of a certain size. Each of the small areas is called a chunk. If it is necessary to discriminate a chunk in the logical volume from a chunk in the physical volume, the former will be referred to as a logical chunk, and the latter will be referred to as a physical chunk.

A storage controller monitors a status of access to each chunk (for example, each logical chunk). In general, access-frequency statistical values associated with respective chunks and obtained in a recent certain period (monitoring period) are used as an index that indicates the status of access. It is known that as the access-frequency statistical value, a count of accesses (namely, a count of inputs and/or outputs associated with reading and writing; or the total sum of access data amounts is used.

The storage controller relocates, to the high-speed storage device (upper tier), data of a chunk having a great access-frequency statistical value and located on the low-speed storage device (lower tier). Further, the storage controller relocates, to the low-speed storage device, data of a chunk having a low access-frequency statistical value and located on the high-speed storage device. This relocation aims to improve the performance of the entire tiered storage system (namely, the system performance).

However, even when the data of a chunk has been relocated to the high-speed storage device, it is not always expected that the access-frequency statistical value of the chunk is increased in accordance with the difference in access speed between the high-speed and low-speed storage devices. Similarly, even when the data of a chunk has been relocated to the low-speed storage device, it is not always expected that the access-frequency statistical value of the chunk is reduced in accordance with the above-mentioned difference in access speed. That is, when data relocation is performed chunk by chunk, based on the access-frequency statistical value acquired at regular monitoring periods, the system performance may not sufficiently be enhanced.

BRIEF DESCRIPTION OF THE DRAWINGS

FIG. 1 is a block diagram showing an exemplary hardware configuration of a computer system according to an embodiment;

FIG. 3 is a block diagram mainly showing an exemplary functional configuration of a storage controller shown in FIG. 1;

FIG. 9 is a flowchart for explaining an exemplary procedure of relocation processing in the embodiment.

DETAILED DESCRIPTION

Figure 2:
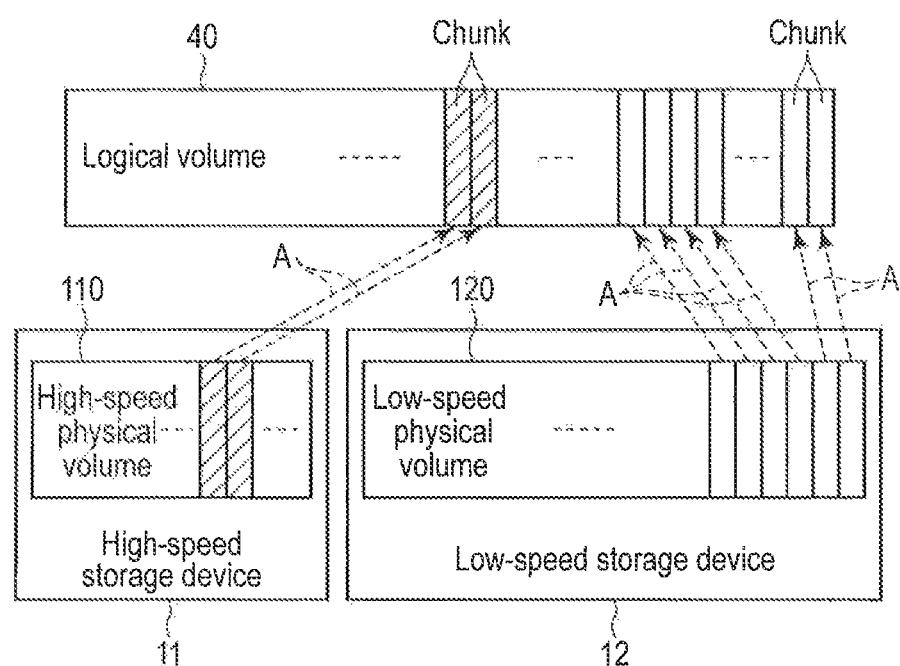
FIG. 2 is a view for explaining exemplary mapping between a logical storage area and a physical storage area in a tiered storage system shown in FIG. 1.

Various embodiments will be described hereinafter with reference to the accompanying drawings.

In general, according to one embodiment, a tiered storage system comprises first and second storage devices, and a storage controller. The first storage device comprises a storage area including a plurality of physical chunks having a first size. The second storage device comprises a storage area including a plurality of physical chunks having the first size, and has a lower access speed and a larger storage capacity than the first storage device. The storage controller controls the first and second storage devices. The storage controller comprises a logical volume management unit, an access statistics collection controller, an evaluation controller and a relocation controller. The logical volume management unit manages a logical volume that includes a plurality of logical chunks having the first size, and is provided to a host computer. The storage areas of the first and second storage devices are allocated to the logical volume physical chunk by physical chunk. The access statistics collection controller collects, during respective monitoring periods, access frequency statistical values representing statuses of accesses to the respective logical chunks. The evaluation controller sets, in access statistical data, a first access frequency statistical value and a second access frequency statistical value associated with a respective one of the logical chunks. The first access frequency statistical value represents a status of access to the respective one of the logical chunks which is in a first location state in which data of the respective one of the logical chunks is located on the first storage device. The second access frequency statistical value represents a status of access to the respective one of the logical chunks which is in a second location state in which data of the respective one of the logical chunks is located on the second storage device. The evaluation controller updates, during the respective monitoring periods, the first or second access frequency statistical value included in the access statistical data and corresponding to a location state of data of the respective one of the logical chunks, based on one of the collected access frequency statistical values, which is associated with the respective one of the logical chunks. The relocation controller determines whether it is necessary to change the location state of the data of the respective one of the logical chunks, based on the first and second access frequency statistical values of the respective logical chunks.

FIG. 1 is a block diagram showing an exemplary hardware configuration of a computer system according to the embodiment. The computer system shown in FIG. 1 includes a tiered storage system 10 and a host computer (hereinafter, referred to as a host) 20. That is, the computer system includes a single host. However, the computer system may include a plurality of hosts.

The host 20 uses the tiered storage system 10 as its own external storage device. The host 20 is connected to the tiered storage system 10 (more specifically, to the storage controller 13 of the tiered storage system 10) through, for example, a host interface bus 30. In the embodiment, the host interface bus 30 is Fibre Channel (FC). However, the host interface bus 30 may be an interface bus other than FC, such as Small Computer System Interface (SCSI), Serial Attached SCSI (SAS), Internet SCSI (iSCSI), Ethernet (registered trademark) or Serial AT Attachment (SATA). The host 20 may also be connected to the tiered storage system 10 via a network.

The host 20 is a physical computer, such as a server or a client personal computer (client PC). In the host 20, an application program for accessing data in the tiered storage system 10 operates. In accordance with this application program, the host 20 uses the tiered storage system 10 via the host interface bus 30.

The tiered storage system 10 includes a high-speed storage device (first storage device) 11, a low-speed storage device (second storage device) 12 and a storage controller 13. The high-speed storage device 11 and the low-speed storage device 12 are connected to the storage controller 13 via a storage interface bus 14. In the embodiment, the storage interface bus 14 is Fibre Channel (FC). However, the storage interface bus 14 may be an interface bus other than FC, like the host interface bus 30.

The high-speed storage device 11 includes, for example, a flash storage device, such as a flash array, excellent in access response performance (i.e., having a high access speed). The flash storage device is realized using a plurality of flash memory boards. Each of the flash memory boards includes a set of flash memories. In the embodiment, it is assumed that each of the flash memory boards is incompatible with a hard disk drive (HDD). However, a plurality of solid-state drives (SSDs) compatible with the HDD may be employed instead of the flash memory boards.

In contrast, the low-speed storage device 12 includes a storage device that satisfies a first condition in association with access response performance and storage capacity. The storage device satisfying the first condition means a storage device having a great storage capacity although it has a lower access response performance (namely, a lower access speed) than the high-speed storage device 11. In the embodiment, the low-speed storage device 12 includes a hard disk drive (HDD) array. The HDD array is, for example, a storage device of a Redundant Arrays of Inexpensive Disks or Redundant Arrays of Independent Disks (RAID) structure that includes a plurality of HDDs. The HDD array may be formed of high-speed HDDs, such as FC HDDs, or of low-speed HDDs, such as SATA HDDs.

The high-speed and low-speed storage devices 11 and 12 do not always have to have an array structure. Further, the high-speed storage device 11 is not always required to be a flash storage device (flash memory), namely, a nonvolatile memory, but may be a volatile memory, such as a dynamic RAM (DRAM). Furthermore, the high-speed storage device 11 may include at least one high-speed HDD, and the low-speed storage device 12 may include at least one low-speed HDD. Alternatively, the low-speed storage device 12 may include an optical disk drive, such as a blue-ray disc (registered trademark) drive or a DVD (registered trademark) drive, or a tape device. If a tape device is used as the low-speed storage device 12, the high-speed storage device 11 may include an optical disk drive.

As described above, the high-speed and low-speed storage devices 11 and 12 may include storage devices selected from a plurality of storage devices having various access speeds and storage capacities. However, as mentioned above, the low-speed storage device 12 must satisfy the first condition in association with the access response performance and storage capacity. The high-speed storage device 11 may include a storage device that satisfies a second condition in association with the access response performance and storage capacity. The storage device satisfying the second condition means a storage device having a high access response performance (namely, a high access speed) although it has a small storage capacity, compared to the low-speed storage device 12.

As described above, the tiered storage system 10 shown in FIG. 1 includes two (two types of) storage devices (namely, the high-speed storage device 11 and the low-speed storage device 12) having different access speeds. In this case, the high-speed storage device 11 is positioned as an upper tier (a high-speed tier, a first tier), and the low-speed storage device 12 is positioned as a lower tier (a low-speed tier, a second tier). The tiered storage system 10 may also include a storage device (as a third tier) having a lower speed (lower tier) and a greater capacity than the low-speed storage device 12.

The storage controller 13 receives, from the host 20, a request (input/output request) for access (a read access or a write access) using a logical address, and executes the requested input/output (I/O) operation. At the execution of the I/O operation, the storage controller 13 translates the logical address into a physical address, using a well-known address translation function. The logical address indicates an address in a logical volume (logical disk) recognized by the host 20. The physical address indicates a physical position in a physical storage area (hereinafter, referred to as a first physical storage area) associated with the logical address, and includes a device identifier (ID) and an intra-device address. The device ID is data unique to a storage device including the first physical storage area, and is, for example, a device number allocated to the storage device. The infra-device address indicates an address, in the storage device, allocated to the first physical storage area.

The storage controller 13 accesses the high-speed storage device 11 or the low-speed storage device 12 based on the physical address. In the embodiment, the high-speed storage device 11 or the low-speed storage device 12 is accessible, using an area of a second size as a minimum unit of access. The area of the second size is called a block (or sector). In the embodiment, the second size is 512 bytes (B).

The storage controller 13 includes a host interface controller (hereinafter, referred to as an HIFC) 130, a storage interface controller (hereinafter, referred to as an SIFC) 131, a memory 132, an HDD 133 and a CPU 134.

The HIFC 130 controls data transfer (data transfer protocol) between the HIFC 130 itself and the host 20. The HIFC 131 receives an input/output (I/O) request (a read or write request) from the host 20, and returns a response to the I/O request. This I/O request designates reading or writing data from or to a logical volume. Upon receiving the I/O request from, the host 20, the HIFC 130 transmits the I/O request to the CPU 134. The CPU 134 having received the I/O request processes the same.

The SIFC 131 receives, from the CPU 134, an access request (a read or write request to a physical volume) corresponding to the I/O request output from the host 20 received by the CPU 135. The access request designates a data read from a physical volume or a data write to the physical volume. In accordance with the received access request, the SIFC 132 accesses the high-speed storage device 11 (namely, the physical volume in the high-speed storage device 11) or the low-speed storage device 12 (namely, the physical volume in the low-speed storage device 12).

The memory 132 is a rewritable volatile memory such as a DRAM. A part of the storage area of the memory 133 is used to store a storage control program 320 (see FIG. 3) loaded from the HDD 133. Another part of the storage area of the memory 132 is used to store address translation data 330 (see FIG. 3) loaded from the HDD 133. Yet another part of the storage area of the memory 132 is used to store access statistical data 340 (see FIG. 3). A memory map including these elements will be described later in detail.

The storage control program 320 (FIG. 3) is stored in the HDD 133. When the storage controller 13 has been started, the CPU 134 loads, into the memory 132, at least a part of the storage control program 320 stored in the HDD 133, by executing an initial program loader (IPL). The IPL is stored in a nonvolatile memory, such as a read-only memory (ROM) or a flash ROM (FROM).

In accordance with the storage control program 320 loaded into the memory 132, the CPU 134 functions as a logical volume management unit 300, an address translation unit 301, an access controller 302, an access statistics collection controller 303, an evaluation value calculator 304, an evaluation controller 305, and a relocation controller 306 (see FIG. 3). That is, the CPU 134 controls the entire tiered storage system 10 (in particular, each element in the storage controller 13) by executing the storage control program 320 stored in the memory 132.

In the embodiment, the storage controller 13 is provided independently of the host 20 as shown in FIG. 1. However, the storage controller 13 may be built in the host 20. In this case, the storage controller 13 (more specifically, the function of the storage controller 13) may be realized using a part of the function of the operating system (OS) of the host 20.

The storage controller 13 may be provided in a card to be inserted for use into the car slot of the host 20. Further, a part of the storage controller 13 may be built in the host 20, and the other part of the storage controller 13 may be provided in the card. The host 20, the storage controller 13, and parts of the high-speed and low-speed storage devices 11 and 12 or the entire devices 11 and 12 may be housed in one housing.

FIG. 2 is a view for describing exemplary mapping between the logical storage area and the physical storage area in the tiered storage system 10 shown in FIG. 1. As shown in FIG. 2, the high-speed storage device 11 and the low-speed storage device 12 include physical volumes 110 and 120 as physical storage areas, respectively. In the description below, physical volume 110 of the high-speed storage device 11 will be referred to as a high-speed physical volume 110, and physical volume 120 of the low-speed storage device 12 will be referred to as a low-speed physical volume 120.

The high-speed physical volume 110 and the low-speed physical volume 120 are divided for management into chunks (namely, physical chunks) of a first size by the storage controller 13. That is, each of the high-speed physical volume 110 and the low-speed physical volume 120 comprises a plurality of chunks. In the embodiment, the first size is 4 kilobytes (KB) that is B times the second size (512B). Thus, one chunk is formed of 8 sectors. It is a matter of course that the first size may be other than 4 KB. For example, it may be 4 megabytes (MB).

At least a part of the area (physical area) of each of she high-speed physical volume 110 and the low-speed physical volume 120 is allocated (i.e., mapped) to the logical volume 40 chunk by chunk, as is indicated by arrows A in FIG. 2. The logical, volume 40 means a logical storage area recognized as a single disk by a host, such as the host 20, which utilizes the tiered storage system 10. The host 20 recognizes the logical volume 40 as a single disk (more specifically, a single logical disk) via the storage controller 13. By virtue of this, the host 20 can utilize the logical volume 40 as its own disk, without regard to the mapping between the chunks (logical chunks) of the logical volume 40 and the chunks (physical chunks) of the high-speed physical volume 110 and the low-speed physical volume 120.

As described above, upon receiving, from the host 20, an access request using a logical address, the storage controller 13 translates the logical address into a physical address. After that, the storage controller 13 actually accesses a physical position, in the storage device, designated by the physical address. To this end, the storage controller 13 manages the address translation data 330 (see FIG. 3 and FIG. 4). The address translation data 330 indicates correspondence between the logical addresses of the logical chunks of the logical volume 40 and the physical addresses of the physical chunks of the high-speed physical volume 110 of the high-speed storage device 11, or of the low-speed physical volume 120 of the low-speed storage device 12.

FIG. 3 is a block diagram mainly showing an exemplary functional configuration of the storage controller 13 shown in FIG. 1. The storage controller 13 comprises the logical volume management unit 300, the address translation unit 301, the access controller 302, the access statistics collection controller 303, the evaluation value calculator 304, the evaluation controller 305, and the relocation controller 306. These functional elements 300 to 306 are software modules realized when the CPU 134 of the storage controller 13 shown in FIG. 1 executes the storage control program 320. However, at least one of the functional elements 300 to 306 may be realized by a hardware module.

The logical volume management unit 300 constructs (defines) and manages a logical volume (such as the logical volume 40) provided to the host 20 (that is, recognizable by the host 20). The logical volume management unit 300 also manages the mapping state of each logical chunk (namely, correspondence between the logical address of each logical chunk and the physical address of a corresponding physical chunk) in the logical volume 40, using the address translation data 330 (more specifically, mapping data MI in the address translation data 330).

The address translation unit 301 translates a logical address into a physical address based on the address translation data 330. The access controller 302 accesses the high-speed storage device 11 or the low-speed storage device 12, based on the physical address translated from the logical address by the address translation unit 301.

The access statistics collection controller 303 monitors the status of access logical chunk by logical chunk in a logical volume (for example, the logical volume 40). The access statistics collection controller 303 collects the access frequency statistical values of respective logical chunks in a most recent certain period (hereinafter, referred to as a monitoring period) indicated by a predetermined monitoring schedule.

In the embodiment, the access statistics collection controller 303 collects, as the access frequency statistical value of a respective one of the logical chunks, a count of accesses to the respective one of the logical chunks in the most recent monitoring period. For the collection of the access count (access frequency statistical value), access counter CTR1 (see FIG. 4) associated with the respective one of the logical chunks (more specifically, the logical address of the respective one of the logical chunks) is used. That is, the access statistics collection controller 303 uses the value CNT of access counter CTR1 as the access frequency statistical value.

The evaluation value calculator 304 computes an evaluation value indicating an effect (more specifically, an effect associated with access performance) resulting from relocation of data in the respective one of the logical chunks to a physical chunk in the high-speed storage device 11 or the low-speed storage device 12. For calculation of this evaluation value, the evaluation value calculator 304 uses a count, (access frequency statistical value) of accesses to the respective one of the logical chunks performed in a monitoring period most recent to the time when the logical address (data) of the respective one of the logical chunks has been mapped (relocated) to a corresponding physical chunk in the high-speed storage device 11. The state where the data of a logical chunk is located on the high-speed storage device 11 will hereinafter be referred to as a first location state.

For calculation of the evaluation value, the evaluation value calculator 304 also uses a count (access frequency statistical value) of accesses to the respective one of the logical chunks performed in a monitoring period most recent to the time when the logical address (data) of the respective one of the logical chunks has been mapped (relocated) to a corresponding physical chunk in the low-speed storage device 12. The state where the data of a logical chunk is located on the low-speed storage device 11 will hereinafter be referred to as a second location state.

The evaluation controller 305 controls the calculation of the evaluation value by the evaluation value calculator 304. For the calculation of the evaluation value by the evaluation value calculator 304, the evaluation controller 305 records, in access counter CTR2_H (FIG. 4) associated with the respective one of the logical chunks, a count (namely, the value of access counter CTR1) of accesses to the respective one of the logical chunks collected during a most recent monitoring period in the first location state. For the calculation of the evaluation value by the evaluation value calculator 304, the evaluation controller 305 also records, in access counter CTR2_L (FIG. 4) associated with the respective one of the logical chunks, a count (namely, the value of access counter CTR1) of accesses to the respective one of the logical chunks collected during a most recent monitoring period in the second location state.

Based on respective evaluation values of the logical chunks calculated by the evaluation value calculator 304, the relocation controller 306 determines a logical chunk whose data is to be relocated from the low-speed storage device 12 to the high-speed storage device 11, and determines a logical chunk whose data is to be relocated from the high-speed storage device 11 to the low-speed storage device 12. The relocation controller 306 relocates the data of the determined logical chunks.

The memory 132 includes a control program area 310, a work area 311, an address translation data area 312, and an access statistical data area 313. The control program area 310 is used to store at least a part of the storage control program 320 executed by the CPU 134. The work area 311 is used to temporarily store data that is used when the CPU 134 executes the storage control program 320. A part of the work area 311 is used to store a first evaluation value list 3111 and a second evaluation value list 3112. The address translation data area 312 is used to store the address translation data 330. The access statistical data area 313 is used to store the access statistical data 340.

The HDD 133 is used to prestore the storage control program 320. The HDD 133 is also used to save the address translation data 330 and the access statistical data 340. At the time of, for example, start of the storage controller 13, at least a part of the storage control program 320, the address translation data 330 and the access statistical data 340 are loaded for use from the HDD 133 into the control program area 310, the address translation data area 312 and the access statistical data area 313 of the memory 132, respectively. The address translation data 330 and the access statistical data 340 loaded into the memory 132 are saved suitably by the HDD 133. That is, the update of the data in the address translation data area 312 and the access statistical data area 313 of the memory 132 is appropriately reflected in the address translation data 330 and the access statistical data 340 saved in the HDD 133. However, in the description below, it is assumed for simplification that the address translation data 330 and the access statistical data 340 are used, stored in the HDD 133.

Figure 4:
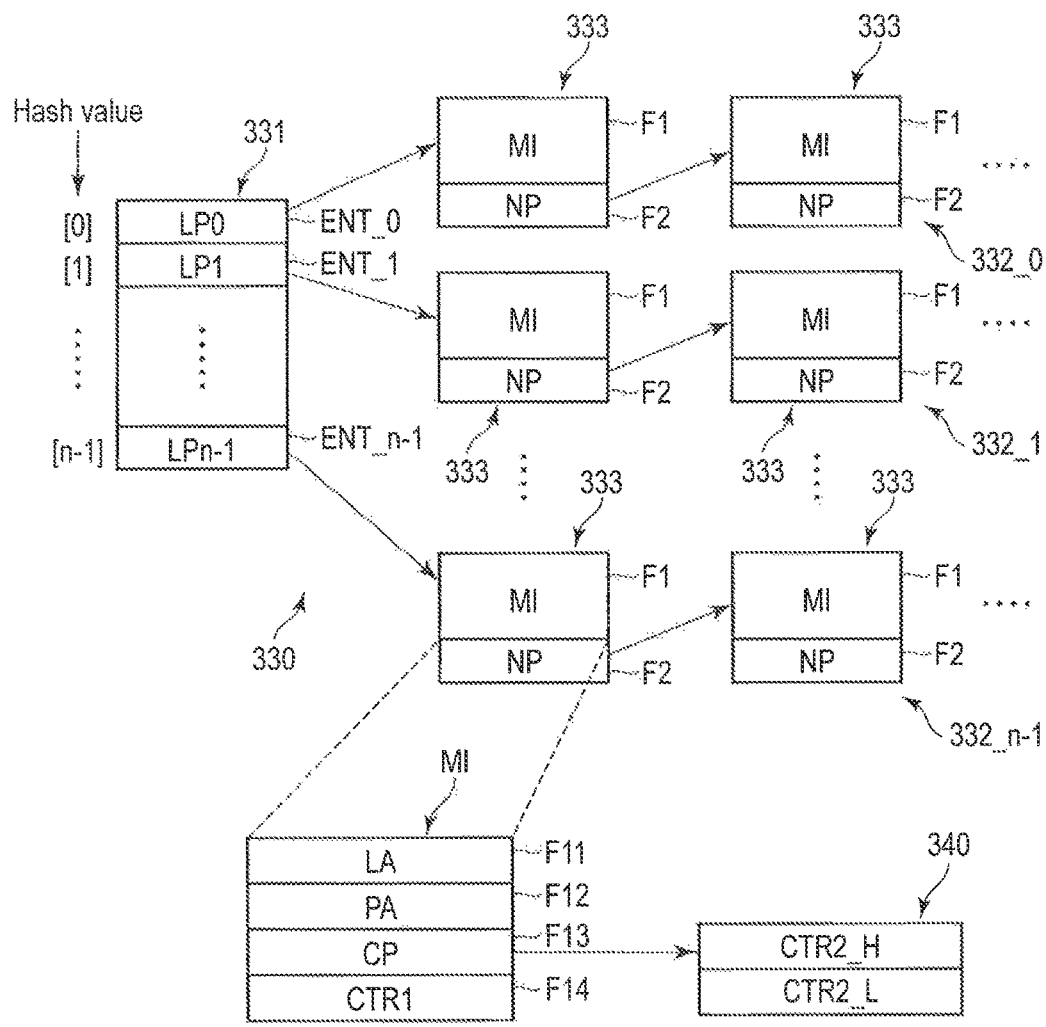
FIG. 4 is a view showing a data structure example of address translation data and access statistical data shown in FIG. 3.

FIG. 4 shows a data structure example of the address translation data 330 and the access statistical data 340 shown in FIG. 3. The address translation data 330 includes a hash table 331 and n address translation hash lists 332_0 to 332_$n-1$, which are associated with the logical volume 40 shown in FIG. 2.

The hash table 331 has entries ENT_0) to ENT_n-1 corresponding to n different hash values 0 to n-1, respectively. In the embodiment, the logical addresses of all logical chunks in the logical volume 40 are classified into n groups G0 to Gn-1 in accordance with the hash values of the logical addresses. Group Gj (j=0, 1, . . . , n-1) is a set of logical addresses having hash value j. Entry ENT_j (entry ENT_j corresponding to hash value j) of the hash table 331 stores list pointer LPj that indicates the leading element 333 of address translation hash list 332_$j$.

Each element (hereinafter, referred to as a hash list element) 333 of address translation hash list 332_$j$ has fields F1 and F2. Mapping data MI is set in field F1 of the hash list element 333. Next pointer NP is set in field F2 of the hash list element 333. Next pointer NP indicates a next hash list element 333 in address translation hash list 332_j. However, NULL (namely, NP=NULL) indicating that no further hash list element 333 exists is set in field F2 of the last hash list element 333 of address translation hash list 332_j.

Mapping data MI has fields F11 to F14. Logical address LA is set in field F11 of mapping data MI. Logical address LA is the logical address of a logical chunk (hereinafter, referred to as a corresponding logical chunk) whose mapping state is managed by mapping data MI, and belongs to group Gj.

Physical address PA is set in field F12 of mapping data MI. Physical address PA indicates a physical chunk in a storage device (the high-speed storage device 11 or the low-speed storage device 12), to which the logical address LA of a corresponding logical chunk is mapped.

Counter pointer CP is set in field F13 of mapping data MI. Counter pointer CP indicates the access statistical data 340. Access counter CTR1 is set in field F14 of mapping data MI. Access counter CTR1 is used to indicate an access frequency statistical value associated with an access to a corresponding logical chunk (namely, a logical chunk having logical address LA) during a most recent monitoring period.

In the embodiment, a count of accesses to a corresponding logical chunk in a most recent monitoring period is used as an access frequency statistical value. That is, access counter CTR1 is used to count the number of accesses to the corresponding logical chunk in the most recent monitoring period. However, the total volume of accessed data of the corresponding logical chunk in the most recent monitoring period may be used as the access frequency statistical value.

As described above, mapping data MI includes logical address LA, physical address PA, counter pointer CP and access counter CTR1 (first access counter). On the other hand, the access statistical data 340 includes access counters CTR2_R and CTR2_L (second and third access counters).

Access counter CTR2_H is used to hold a count of accesses counted by access counter CTR1 in a most recent monitoring period when the data of the corresponding logical chunk is in the first location state. Access counter CTR2_L is used to hold a count (second access frequency statistical value) of accesses counted by access counter CTR1 in a most recent monitoring period when the data of the corresponding logical chunk is in the second location state.

Figure 5:
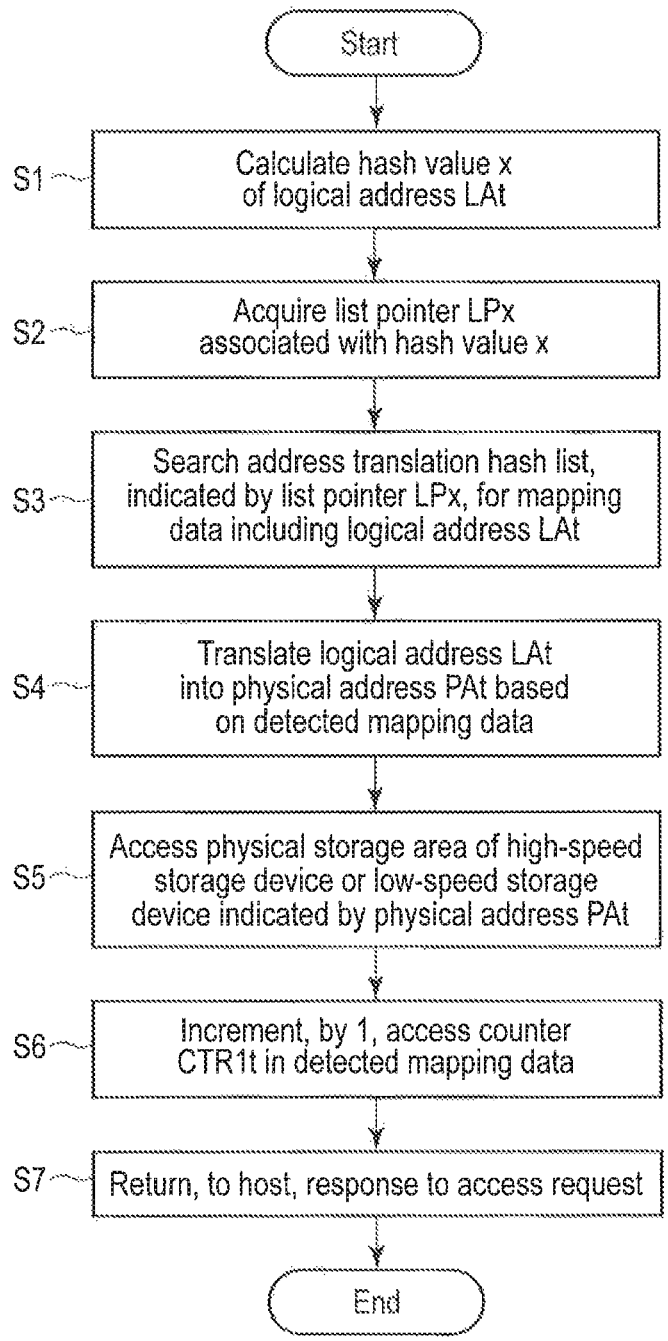
FIG. 5 is a flowchart for explaining an exemplary procedure of access processing in the embodiment.

Referring next to FIG. 5, a description will be given of access (I/O) processing in the embodiment. FIG. 5 is a flowchart for explaining an exemplary procedure of the access processing. Assume here that the host 20 has issued, to the tiered storage system 10 via the host interface bus 30, an access request which designates a data read or write, and that the storage controller 13 of the storage system 10 has received the access request from the host 20. This access request includes logical address LAt and data indicating the length (for example, a transfer data length that indicates the number of data blocks transferred) of data to be accessed. For simplification of the description, assume here that logical address LAt indicates the leading block of logical chunk CHKt, and the transfer data length indicates the number of blocks constituting logical chunk CHKt. That is, assume that the access request from the host 20 requests an access to logical chunk CHKt designated by logical address LAt.

In this case, the address translation unit 301 of the storage controller 13 calculates hash value x of logical address LAt based on logical address LAt (step S1). Next, the address translation unit 301 acquires list pointer LPx set in entry ENT_x of the hash table 331 corresponding to hash value x (step S2).

Next, the address translation unit 301 searches address translation hash list 332_x, indicated by list pointer LPx, for mapping data MIt including logical address LAt (step S3). Next, the address translation unit 301 acquires physical address PAt included in mapping data MIt. That is, the address translation unit 301 translates logical address LAt into physical address PAt, based on mapping data MIt (step S4). For the search of mapping data MIt (address translation data), another data structure, such as a balanced tree, may be employed instead of the address translation hash list.

When logical address LAt has been translated into physical address PAt, the access controller 302 of the storage controller 13 accesses a physical storage area (namely, a physical chunk allocated to logical chunk of CHKt), of the high-speed storage device 11 or the low-speed storage device 12, which is indicated by physical address PAt (step S5). More specifically, the access controller 302 reads data from or writes data to a physical storage area of the high-speed storage device 11 or the low-speed storage device 12, which is indicated by physical address PAt. The device ID included in physical address PAt indicates the physical storage area of which is to be accessed, the high-speed storage device 11 or the low-speed storage device 12.

Assume here that the physical storage area of the high-speed storage device 11 or the low-speed storage device 12, which is indicated by physical address PAt, has been accessed as described above. In this case, the access statistics collection controller 303 of the storage controller 13 increments, by 1, value CNTt of access counter CTR1t included in mapping data MIt in address translation hash list 332_x detected in step S3 (step S6). Thus, the access statistics collection controller 303 increments, by 1, value CNTt of access counter CTR1t associated with logical address LAt of logical chunk CHKt, whenever logical chunk CHKt is accessed during the monitoring period. Thus, the access statistics collection controller 303 records, in access counter CTR1t, a count of accesses to logical chunk CHKt made in the monitoring period.

When value CNTt of access counter CTR1t has been incremented by 1, the access controller 302 determines that an access based on the access request from the host 20 has been completed, and returns, to the host 20, a response to the access request (step S7). The storage controller 13, which has completed access processing based on the access request from the host 20, waits for a subsequent access request issued from the host 20.

Figure 6:
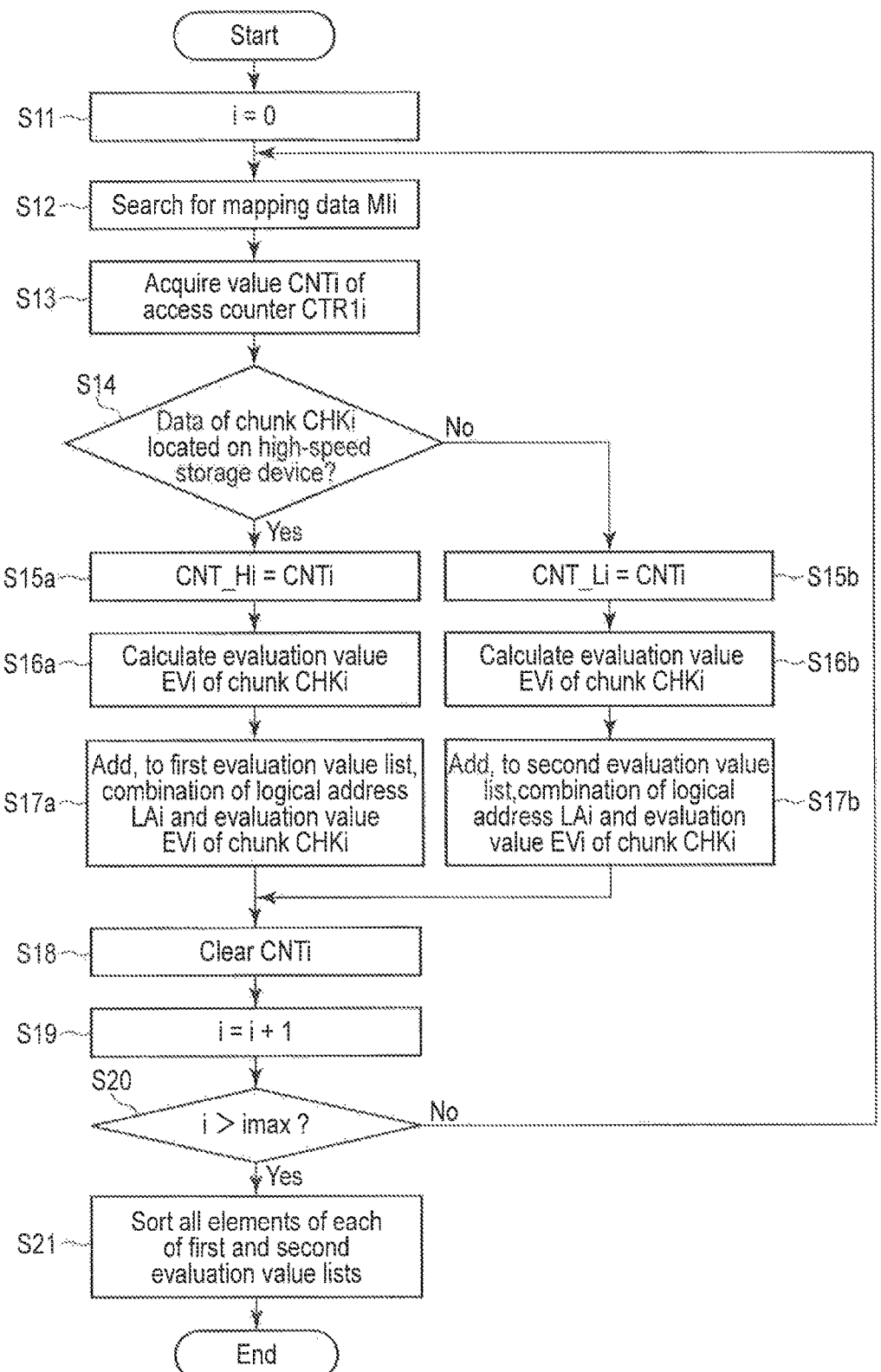
FIG. 6 is a flowchart for explaining an exemplary procedure of evaluation processing in the embodiment.

Referring then to FIG. 6, a description will be given of evaluation processing in the embodiment. FIG. 6 is a flowchart for explaining an exemplary procedure of the evaluation processing. The evaluation controller 305 of the storage controller 13 performs, in cooperation with the evaluation value calculator 304, the evaluation processing during each monitoring period mentioned above, for example, whenever the monitoring period elapses, as described below.

First, the evaluation controller 305 sets variable i to an initial value of 0 (step S11). Variable i represents the position of logical chunk CHKi in the logical volume 40. The evaluation controller 305 searches the address translation data 330 for mapping data MIi associated with an i-th logical chunk CHKi in the logical volume 40 (more specifically, logical address LAi of i-th logical chunk CHKi) (step S12), as described below.

First, the evaluation, controller 305 calculates hash value y of logical address LAi, based on logical address LAi of logical chunk CHKi. Next, the evaluation controller 305 acquires list, pointer LPy from entry ENT_y of the hash table 331 corresponding to hash value y. After that, the evaluation controller 305 searches for mapping data MIi including logical address LAi by tracing a plurality of hash list elements 333 that constitutes address translation hash list 332_y indicated by list pointer LPy. Mapping data MIi may be searched for by the address translation unit 301.

After detecting mapping data MIi, the evaluation controller 305 acquires value CNTi of access counter CTR1i from mapping data MIi (step S13). Next, the evaluation controller 305 determines whether the data of logical chunk CHKi is located on the high-speed storage device 11, based on the device ID in physical address PAi included in mapping data MIi (step S14).

If the data of logical chunk CHKi is located on the high-speed storage device 11 (Yes in step S14), i.e., if the data of logical chunk CHKi is in the first location state, the evaluation controller 305 proceeds to step S15a. In step S15a, the evaluation controller 305 records value CNTi of access counter CTR1i in access counter CTR2_Hi of the access statistical data 340 indicated by counter pointer CPi of mapping data MIi. As a result, value CNI_Hi (first access frequency statistical value) of access counter CTR2_Hi is updated to value CNTi counted by access counter CTR1i during a most recent monitoring period in which the data of logical chunk CHKi is in the first location state. In contrast, value CNT_Li (second access frequency statistical value) of access counter CTR2_Li of the access statistical data 340 indicated by counter pointer CPi is not updated.

If the data of logical chunk CHKi is located on the low-speed storage device 12 (No in step S14), i.e., if the data of logical chunk CHKi is in the second location state, the evaluation, controller 305 proceeds to step S15b. In step S15b, the evaluation controller 305 records value CNTi of access counter CTR1i in access counter CTR2_Li of access statistical data 340 indicated by counter pointer CPi of mapping data MI_i. As a result, value CNT_Li (second access frequency statistical value) of access counter CTR2_Li is updated to value CNTi counted by access counter CTR1i during a most recent monitoring period in which the data of logical chunk CHKi is in the second location state. In contrast, value CNT_Hi (first access frequency statistical value) of access counter CTR2_Hi of the access statistical data 340 indicated by counter pointer CPi is not updated.

After executing step S15a or S15b, the evaluation controller 305 starts the evaluation value calculator 304. At this time, the evaluation value calculator 304 calculates evaluation value EVi of Chunk CHKi based on values CNT_Hi and CNT_Li of access counters CTR2_Hi and CTR2_Li, using the following equation (step S16a or 16b):

$$EVi = CNT\_Hi/CNT\_Li \qquad (1)$$

As is evident from equation (1), evaluation value EVi represents a ratio (namely, a performance improvement ratio) with which the access performance (more specifically, the access count) is enhanced when the data of logical chunk CHKi has been transferred from the low-speed storage device 12 to the high-speed storage device 11. The inverse of evaluation value EVi represents a ratio with which the access performance is reduced when the data of logical chunk CHKi has been transferred from the high-speed storage device 11 to the low-speed storage device 12. That is, it can be said that evaluation value EVi represents the degree of influence on the access performance assumed when the data of logical chunk CHKi has been transferred from the low-speed storage device 12 to the high-speed storage device 11, or from the high-speed storage device 11 to the low-speed storage device 12.

In the embodiment, the initial values of CNT_Hi and CNT_Li of access counters CTR2_Hi and CTR2_Li are 0. Accordingly, if the data of logical chunk CHKi has never been located on the high-speed storage device 11, CNT_Hi is 0. Similarly, if the data of logical chunk CHKi has never been located on the low-speed storage device 12, CNT_Li is 0.

If CNT_Hi is 0, the evaluation value calculator 304 calculates estimate CNT_Hi_e, based on value CNT_Li of access counter CTP2_Li and reference performance improvement ratio RPIR. Estimate CNT_Hi_e means the value of access counter CTR2_Hi estimated when the data of logical chunk CHKi is assumed to have been located on the high-speed storage device 11. Reference performance improvement ratio RPIR means a performance improvement ratio estimated when the data of a logical chunk has been transferred from the low-speed storage device 12 to the high-speed storage device 11. For example, RPIR=2 indicates that the access count is estimated to be doubled when the data of logical chunk CHKi has been transferred from the low-speed storage device 12 to the high-speed storage device 11.

In the embodiment, the evaluation value calculator 304 calculates estimate CNT_Hi_e using the following equation:

$$CNT\_Hi\_e = CNT\_Li \times \text{RPIR} \qquad (2)$$

As CNT_Hi in equation (1), the evaluation value calculator 304 uses estimate CNT_Hi_e, calculated by equation (2), in place of value CNT_Hi of access counter CTR2_Hi.

Similarly, if CNT_Li is 0, the evaluation value calculator 304 calculates estimate CNT_Li_e, based on value CNT_Hi of access counter CTR2_Hi and reference performance improvement ratio RPIR. Estimate CNT_Li_e means the value of access counter CTR2_Li estimated when the data of logical chunk CHKi is assumed to have been located on the low-speed storage device 12.

In the embodiment, the evaluation value calculator 304 calculates estimate CNT_Li_e, using the following equation:

$$CNT\_Li\_e = CNT\_Hi/\text{RPIR} \qquad (3)$$

As CNT_Li in equation (1), the evaluation value calculator 304 uses estimate CNT_Li_e, calculated by equation (3), in place of value CNT_Li of access counter CTR2_Li.

As is evident from equation (1), evaluation value EVi has three main features described below.

a1) The greater the difference (namely, an increase in access count) between value CNT_Hi of access-counter CTR2_Hi (namely, an access count in the first location state) and value CNT_Li of access counter CTR2_Li (namely, an access count in the second location state), the greater (higher) evaluation value EVi (performance improvement ratio).

a2) In the case of the same difference, the smaller CNT_Hi and CNT_Li (access counts) themselves, the greater evaluation value EVi.

a3) In the case of the same performance improvement ratio, evaluation value EVi has the same value regardless of CNT_Hi and CNT_Li (access counts).

Assume here that evaluation value EVi of logical chunk CHKi has been calculated by the execution of step S16a. In this case, the evaluation controller 305 adds a combination of logical address LAi and evaluation value EVi of logical chunk CHKi to the first evaluation value list 3111 in the work: area 311 of the memory 132 (step S17a). As a result, the first evaluation value list 3111 holds combinations of logical addresses LAi and evaluation values EVi associated with all logical chunks CHKi (first logical chunks) of the first location state during a most recent monitoring period.

Assume also that evaluation value EVi of logical chunk CHKi has been calculated by the execution of step S16b. In this case, the evaluation controller 305 adds a combination of logical address LAi and evaluation value EVi of logical chunk CHKi to the second evaluation value list 3112 in the work area 311 of the memory 132 (step S17b). As a result, the second evaluation value list 3111 holds combinations of logical addresses LAi and evaluation values Evi associated with all logical chunks CHKi (second logical chunks) of the second location state during a most recent monitoring period.

After the evaluation controller 305 executes step S17a or 17b, the access statistics collection controller 303 of the storage controller 13 clears value CNTi of access counter CTR1i to detect an access count in a subsequent monitoring period (step S18). In the embodiment, before value CNTi of access counter CTR1i is cleared, it is recorded on access counter CTR2_Hi or CTR2_Li of the access statistical data 340, as described above: (step S15a or S15b). Accordingly, access counters CTR2_Hi and CTR2_Li indicate respective values CNTi counted by access counter CTR1i during respective most recent monitoring periods in which the data of logical chunk CHKi is in the first and second location states. Therefore, in the embodiment, the evaluation value calculator 304 can calculate, at regular monitoring periods, based on access counters CTR2_Hi and CTR2_Li, a performance improvement ratio assumed when data of logical chunk CHKi has been transferred from the low-speed storage device 12 to the high-speed storage device 11.

After value CNTi of access counter CTR1i is cleared (step S18), the evaluation controller 305 increments variable i by 1 (step S19). Subsequently, the evaluation controller 305 determines whether incremented variable i exceeds a maximum value imax set for variable i (step S20). The maximum value imax is equal to the total number of logical chunks CHKi in the logical volume 40.

If incremented variable i does not exceed imax (No in step S20), the evaluation controller 305 returns to step S12 to calculate evaluation value EVi of subsequent logical chunk CHKi in the logical volume 40. After that, the evaluation controller 305 cooperates with the evaluation value calculator 304 to re-execute the above-described processing beginning with step S12. The evaluation controller 305 repeats this operation until incremented variable i exceeds imax.

By the above processing, the evaluation controller 305 records values CNTi of access counters CTR1i in respective access (counters CTR2_Hi or CTR2_Li associated with all logical chunks CHKi in the logical volume 40 (i=0, 1, . . . , imax) (steps S15a and S15b). On the other hand, the evaluation value calculator 304 calculates respective evaluation values EVi associated with all logical chunks CHKi (steps S15a and 16b). The evaluation controller 305 generates, in the work area 311, the first evaluation value list 3111 that holds combinations of logical addresses LAi and evaluation values EVi associated with logical chunks CHKi of the first location state (first logical chunks) included in all logical chunks CHKi (step S17a). Similarly the evaluation controller 305 generates, in the work area 311, the second evaluation value list 3112 that holds combinations of logical addresses LAi and evaluation values EVi associated with logical chunks CHKi of the second location state (second logical chunks; included in ail logical chunks CHKi (step S17b).

Assume here that incremented variable i has exceeded imax (Yes in step S20). In this case, the evaluation, controller 305 determines that evaluation values EVi of all logical chunks CHKi in the logical volume 40 have been calculated. At this time, the evaluation controller 303 sorts all elements of the first and second evaluation value lists 3111 and 3112 in, for example, a descending order of evaluation value (step S21). This is the completion of the evaluation processing.

Figure 7:
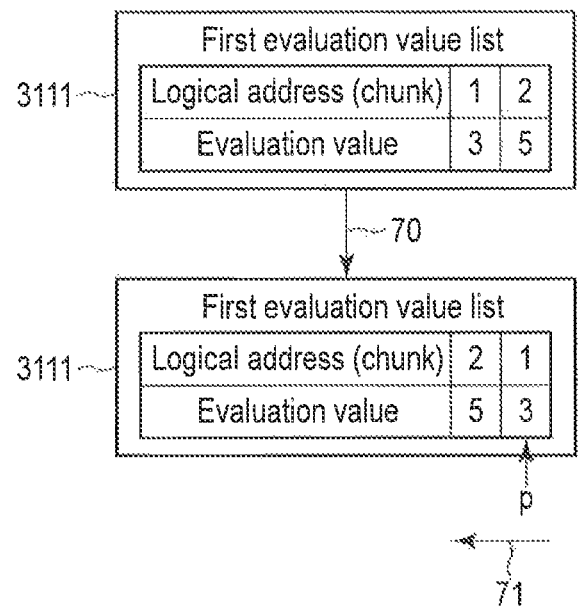
FIG. 7 shows examples of a first evaluation-value list before and after sorting.
Figure 8:
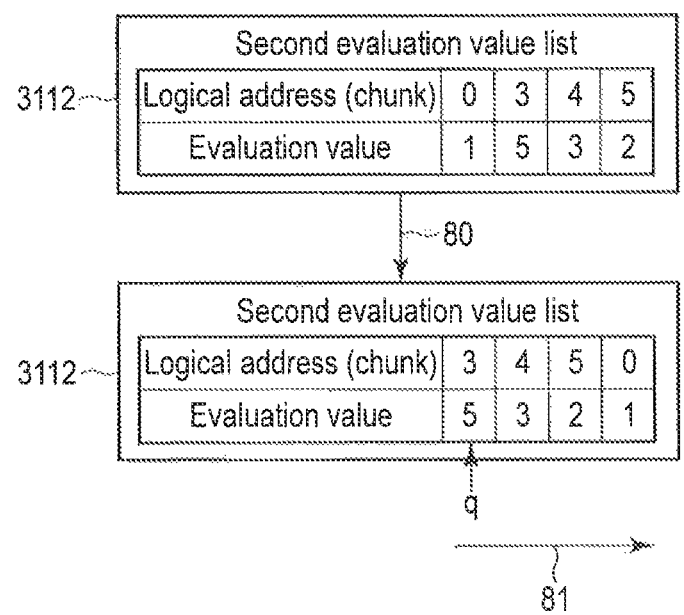
FIG. 8 shows examples of a second evaluation-value list before and after sorting.

FIG. 7 shows examples of the first evaluation value list 3111 before and after sorting, and FIG. 8 shows examples of the second evaluation value list 3112 before and after sorting. In FIG. 7, the first evaluation value list 3111 before sorting is shown on the bottom side of arrow 70, and the first evaluation value list 3111 after sorting is shown on the tip side of arrow 70. In FIG. 8, the second evaluation value list 3112 before sorting is shown on the bottom side of arrow 80, and the second evaluation value list 3112 after sorting is shown on the tip side of arrow 30.

In the examples shown in FIGS. 7 and 8, the logical volume 40 is supposed to include six (imax=6) logical chunks CBK0 to CHK5 for simplification of the description. Logical chunks CHK0 to CHK5 have logical addresses LA0 to LA5, respectively. Assume here that two logical chunks are mapped in the high-speed storage device 11 as shown in the example of the first evaluation value list 3111 of FIG. 7. Assume also that four logical chunks are mapped in the low-speed storage device 12 as shown in the example of the second evaluation value list 3112 of FIG. 8. In the embodiment, the storage capacity of the high-speed storage device 11 is smaller than that of the low-speed storage device 12. The number of logical chunks mapped in the high-speed storage device 11 is generally smaller than that of logical chunks mapped in the low-speed storage device 12. That is, the number Npe of elements in the first evaluation value list 3111 is smaller than the number Nqe of elements in the second evaluation value list 3112, as shown in the examples of FIGS. 7 and 8.

Referring then to FIG. 9, a description will be given of relocation processing in the embodiment. FIG. 9 is a flow-chart for explaining an exemplary procedure of the relocation processing. The relocation controller 306 of the storage controller 13 performs the relocation processing after the completion of the evaluation processing, as described below.

First, the relocation controller 306 sets each of variables p and q to an initial value of 1 (step S31). Variable p is used, for example, to select, in ascending order, evaluation values from the first evaluation value list 3111 obtained after sorting. In the embodiment, variable p indicates the rank of evaluation value EVu to be selected from the first evaluation value list 3111 obtained after sorting. Variable 1 is used to select, in descending order, evaluation values from the second evaluation value list 3112 obtained after sorting. In the embodiment, variable q indicates the rank of evaluation value EVv to be selected from the second evaluation value list 3112 obtained after sorting.

Next, the relocation controller 306 selects q-th highest evaluation value EVv from the second evaluation value list 3112 obtained after sorting (step S32). In this example, q is 1. In this case, as is evident from FIG. 8, the relocation controller 306 selects, as q-th (=1) highest evaluation value EVv, evaluation value EV3 (=5) included in the leading element of the second evaluation value list 3112 obtained after sorting, namely, evaluation value EV3 that is combined with logical address LA3 of logical chunk CHK3.

Next, the relocation controller 306 selects p-th lowest, evaluation value Evu from the first evaluation value list 3111 obtained after sorting (step S33). In this example, p is 1. In this case, as is evident from FIG. 7, the relocation controller 306 selects, as p-th (=1) lowest evaluation value EVu, evaluation value EV1 (=3) included in the last element of the first evaluation value list 3111 obtained after sorting, namely, evaluation value EV1 that is combined with logical address LA1 of logical chunk CHK1. Step S33 may be performed before step S32.

As described above, the relocation controller 306 selects the combination of evaluation values EVv and EVu by the execution of steps S32 and S33. Subsequently, the relocation controller 306 determines whether evaluation value EVv is greater than evaluation value EVu (step S34). Since in this example, evaluation value EVv (=EV3) is 5 and evaluation value EVu (=EV1) is 3, evaluation value EVv is greater than evaluation value EVu (Yes in step S34).

If evaluation value EVv is greater than evaluation value EVu as mentioned above, the relocation controller 306 determines that the access frequency of logical chunk CHKu corresponding to evaluation value EVu is not greatly changed even if logical chunk CHKu is mapped to either the high-speed storage device 11 or the low-speed storage device 12. Therefore, the relocation controller 306 determines that the data of logical chunk CHKu is to be transferred from the high-speed storage device 11 to the low-speed storage device 12, in order to effectively use the high-speed storage device 11 having a smaller storage capacity than the low-speed storage device 12, even though the access frequency itself of logical chunk CHKu is high.

In contrast, the relocation controller 306 determines that if logical chunk CHKv corresponding to evaluation value EVv greater than valuation value EVu is mapped to the high-speed storage device 11, the access frequency of logical chunk CHKv will greatly increase, even if the access frequency of logical chunk CHKv is not necessarily conspicuously high. In view of this, the relocation controller 306 determines that the data of logical chunk CHKv is to be transferred from the low-speed storage device 12 to the high-speed storage device 11.

In this case, the relocation controller 306 acquires logical address LAu that is combined with evaluation value EVu in the first evaluation value list 3111 (step S35). In step S35, the relocation controller 306 relocates, to a free physical chunk in the low-speed storage device 12, the data of logical chunk CHKu indicated by acquired logical address LAu (namely, logical chunk CHKu corresponding to evaluation value EVu). The data relocation in step S35 will hereinafter be described in detail.

First, the relocation controller 306 searches for mapping data MIu including logical address LAu, in the same procedure as that of the translation of logical address LAt into physical address PAt by the address translation unit 301, thereby acquiring physical address PAu from mapping data MIu. Alternatively, mapping data MIu may be searched for by the address translation unit 301.

In the embodiment, acquired physical address PAu includes the device ID that indicates the high-speed storage device 11. The relocation controller 306 reads data from a physical chunk of the high-speed storage device 11 indicated by acquired physical address PAu. Next, the relocation controller 306 selects one free physical chunk from a set of free physical chunks in the low-speed storage device 12. The method of managing a set of free physical chunks in the low-speed storage device 12 is well known, and therefore will not be described.

The relocation controller 306 writes the data, read from the physical chunk of the high-speed storage device 11, to the free physical, chunk selected from the set of free physical chunks of the low-speed storage device 12. Thus, the data of logical chunk CRKu having evaluation value EVu lower than evaluation value EVv is transferred from the high-speed storage device 11 to the low-speed storage device 12. That is, the data of logical chunk CHKu located on the high-speed storage device 11 is relocated to the low-speed storage device 12. Further, the physical chunk of the high-speed storage device 11, where the data of logical chunk CHKu was stored before this relocation, is managed as a free physical chunk.

Next, the relocation controller 306 acquires logical address LAv that is combined with evaluation value EVv in the second evaluation value list 3112 (step S36). In step S36, the relocation controller 306 relocates, to a free physical chunk in the high-speed storage device 11, the data of logical chunk CHKv (namely, logical chunk CHKv corresponding to evaluation value EVv) indicated by acquired logical address LAv. The data relocation in step S36 will hereinafter be described in detail.

First, the relocation controller 306 searches for mapping data MIv including logical, address LAv, in the same procedure as that of the translation of logical address LAt into physical address PAt by the address translation unit 301, thereby acquiring physical address PAv from mapping data MIv. Alternatively, mapping data MIv may be searched for by the address translation unit 301.

In the embodiment, acquired, physical address PAv includes the device ID that indicates the low-speed storage device 12. The relocation controller 306 reads data from a physical chunk of the low-speed storage device 12 indicated by acquired physical address PAv. Next, the relocation controller 306 selects one free physical chunk from, a set of free physical chunks in the high-speed storage device 11. The selected free physical chunk may be a physical chunk of the high-speed storage device 11 where the data of logical chunk CHKu was stored before the relocation of step S35. The method of managing a set of free physical chunks in the high-speed storage device 11 is well known, and therefore will not be described.

The relocation controller 306 writes the data, read from the physical chunk of the low-speed storage device 12, to the free physical chunk selected from the set of free physical chunks of the high-speed storage device 11. Thus, the data of logical chunk CHKv Having evaluation value EVv greater than evaluation value EVu is transferred from the low-speed storage device 12 to the high-speed storage device 11. That is, the data of logical chunk CHKv located on the low-speed storage device 12 is relocated to the high-speed storage device 11.

After executing steps S30 and S36, the relocation controller 306 updates mapping data MIu of logical chunk CHKu, and mapping data MIv of logical chunk CHKv to reflect the above-mentioned relocation (step S37). More specifically, the relocation controller 306 changes physical address PAu in mapping data MIu including logical address LAu, into the physical address of the physical chunk into which the data of logical chunk CHKu indicated by logical address LAu has been relocated. Further, the relocation controller 306 changes physical address PAv in mapping data MIv including logical address LAv, into the physical address of the physical chunk into which the data of logical chunk CHKv indicated by logical address LAv has been relocated.

Next, the relocation controller 306 increments, by 1, each of variables p and q (step S38). In this example, variables p and q are each incremented from 1 to 2. Thus, in the embodiment, variable q is set and updated so as to coincide with variable p (steps S31 and S38). Therefore, variable p may be used instead of variable q. That is, variable q is not necessarily needed.

Next, the relocation controller 306 determines whether incremented variable p exceeds the number Npe of elements in the first evaluation value list 3111 (step S39). That is, the relocation controller 306 determines whether ail evaluation values EVu have been selected from the first evaluation value list 3111. As described above, Npe is smaller than the number Nqe of elements in the second evaluation value list 3112. Accordingly, incremented variable p exceeds Npe before incremented variable q exceeds Nqe. In the example of FIG. 7, Npe is 2. In this example, variable p (=2) does not exceed Npe (=2) (No in step 339). In this case, the relocation controller 306 returns to step S32.

In step S32, the relocation controller 306 selects q-th highest evaluation value EVu from the second evaluation value list 3112 obtained after sorting. In this case, q is 2. At this time, as is evident from FIG. 8, the relocation controller 306 selects, as q-th (=2) highest valuation value EVv, evaluation value EV4 (=3) included in the second element of the second evaluation value list 3112 obtained after sorting, i.e., evaluation value EV4 combined with logical address LA4. Thus, the relocation controller 306 selects evaluation values from the second evaluation value list 3112 obtained after sorting, beginning with the evaluation value included in the leading element of the list, in the order indicated by arrow 81 in FIG. 8, i.e., in descending order of evaluation value.

Next, the relocation controller 306 selects p-th lowest evaluation value EVu from the first evaluation value list 3111 obtained after sorting (step 333). In this case, p is 2. At this time, as is evident from FIG. 7, the relocation controller 306 selects, as p-th (=2) lowest evaluation value EVv, evaluation value EV2 (=3) included in the second last, element of the first evaluation value list 3111 obtained after sorting, i.e., evaluation value EV2 combined with logical address LA2. Thus, the relocation controller 306 selects evaluation values from the first evaluation value list 3111 obtained after sorting, beginning with the evaluation value included in the last element of the list, in the order indicated by arrow 71 in FIG. 7, i.e., in ascending order of evaluation value.

Next, the relocation controller 306 determines whether evaluation value EVv is greater than evaluation value EVu (step S34). In this example, evaluation value EVv (=EV4) is 3, and is not greater than evaluation value EVu (=EV2) that is 5 (No in step S34). In this ease, the relocation controller 306 completes the relocation processing. Moreover, if incremented variable p exceeds the number Npe of elements in the first evaluation value list 3111 (Yes in step S39), i.e., if all evaluation values EVu have been selected from, the first evaluation value list 3111, the relocation controller 306 completes the relocation processing.

By the way, in the conventional techniques, a logical chunk, whose data is to be transferred, is determined based on value CNTi of access counter CTR1i associated with each logical chunk CHKi (namely, the access frequency statistical value). More specifically, the data of logical chunk CHKu having a high access frequency is located on the high-speed storage device 11, and the data of logical chunk CHKv having a low access frequency is located on the low-speed storage device 12.

Assume here that tasks A and B are executed in the host 20, the data of logical chunks CHKa and CHKb to be accessed by tasks A and B, respectively, is all stored in the low-speed storage device 12. Assume also that logical chunks CHKa and CHKb have substantially the same access frequently. If in this case, the data of logical chunks CHKa and CHKb has been transferred to the high-speed storage device 11, logical chunks CHKa and CHKb do not necessarily have substantially the same access frequency setter the dates transfer. That is, such a case may occur where, for example, the frequency of access by task A to logical chunk CHKa is increased after data transfer to the high-speed storage device 13, while the frequency access by task B to logical chunk CHKb is not so increased after the transfer. In contrast, if the data of logical chunks CHKa and CHKb has been transferred from the low-speed storage device 12 to the high-speed storage device 11, logical chunks CHKa and CRKb may not have substantially the same reduction in access frequency. Therefore, the technique of relocating the data of logical chunk CHKi only based on the access frequency statistical value may cause useless consumption of the storage capacity of the high-speed storage device 11, thereby degrading system performance.

In contrast, in the embodiment, a logical chunk, whose data is to be transferred, is determined based on evaluation value EVi of each logical chunk CHKi. Evaluation value EVi is calculated as described above, based on values CNT_Hi and CNT_Li of access counters CTR2_Hi and CTR2_Li associated with logical chunk CHKi, and indicates a performance improvement ratio obtained when the data of logical chunk CHKi has been transferred from the low-speed storage device 12 to the high-speed storage device 11.

Assume here that the data of logical chunk CHKu is located on the high-speed storage device 11, and the data of logical chunk CHKv is located on the low-speed storage device 12. Assume also that in this state, evaluation value EVv of logical chunk CHKv has been selected in step S32, and evaluation value EVu of logical chunk CHKu has been selected in step S33. If evaluation value EVv is greater than evaluation value EVu (Yes in step S34), the relocation controller 306 relocates the data of logical chunk CHKu to the low-speed storage device 12 (step S35), and relocates the data of logical chunk CHKv to the high-speed storage device 11 (step S36), as is described above. It is expected that this relocation will significantly increase the access frequency of logical chunk CHKv. In contrast, it is expected that the relocation will not significantly vary the access frequency of logical chunk CHKu. That is, in the embodiment, the system performance can be enhanced by effectively using the storage area of the high-speed storage device 11 that has a smaller storage capacity than the low-speed storage device 12 although the access speed of the former is higher than that of the latter.

In the embodiment, all elements of the first and second evaluation value lists 3111 and 3112 are sorted in descending order of evaluation value. Alternatively, all elements of the first and second evaluation value lists 3111 and 3112 may be sorted in ascending order of evaluation value. Yet alternatively, all elements of one of the first and second evaluation value lists 3111 and 3112 may be sorted in ascending order of evaluation value. Further, it is not always necessary to sort all elements of the first evaluation value list 3111 and/or the second evaluation value list 3112. Even if such first and second evaluation value lists 3111 and 3112 are used, the relocation controller 306 can select q-th highest evaluation value EVv from the second evaluation value list 3112, and p-th lowest evaluation value EVu from the first evaluation value list 3111. In this case, however, the efficiency of evaluation value selection is lower than in the embodiment.

Moreover, although the embodiment employs two evaluation value lists, i.e., the first and second evaluation value lists 3111 and 3112, it may employ another type evaluation list (hereinafter, referred to as a total evaluation value list). In this case, it is assumed that each element held in the total evaluation list comprises a combination of logical address LAi, flag data F and evaluation value EVi. The flag data F indicates whether the data of logical chunk CHKi indicated by logical address LAi is located on the high-speed storage device 11 or the low-speed storage device 12. The flag data F indicating the former case will be referred to as flag data FH, and the flag data F indicating the latter case will be referred to as flag data FL. Instead of the flag data F, the device ID representing the high-speed storage device 11 or the low-speed storage device 12 may be used.

If the total evaluation value list is used, the evaluation controller 305 may add, to the total evaluation value list in a step corresponding to step S17a, the combination of logical address LAi, flag data FH, and evaluation value EVi, and may add, to the total evaluation value list in a step corresponding to step S17b, the combination of logical address LAi, flag data FL, and evaluation value EVi. Further, the evaluation controller 305 may extract, in a step corresponding to step S21, all elements including flag data FH (hereinafter, referred to as first elements) from the total evaluation value list, and may generate a first evaluation value list 3111 in which the first elements are relocated in, for example, a descending order of evaluation values EVi in the first elements. Similarly, the evaluation controller 305 may extract, in a step corresponding to step S21, all elements including flag data FL (hereinafter, referred to as second elements) from the total evaluation value list, and may generate a second evaluation value list 3112 in which the second elements are relocated in, for example, a descending order of evaluation values EVi in the second elements. Flag data FH may be deleted from each of the first elements located on the generated first evaluation value list 3111. Similarly, flag data FL may be deleted from each of the second elements located on the generated second evaluation value list 3112. Furthermore, based on the device ID included in mapping data MIi that includes logical address LA1, the evaluation controller 305 and the relocation controller 306 can determine in which one of the high-speed storage device 11 and the low-speed storage device 12, data of logical chunk CHKi indicated by logical address LAi is located. Therefore, the flag data F (device ID) may be deleted from each element of the total evaluation value list.

Moreover, the relocation controller 306 may select, in a step corresponding to step S32, the q-th highest evaluation value EVq from the set of the second elements in the total evaluation value list, and may select, in a step corresponding to step S33, the p-th highest evaluation value EVp from the set of the first elements in the total evaluation value list. In this case, the first and second evaluation value lists 3111 and 3112 can be omitted. In this case, however, the efficiency of evaluation value selection is lower than in the embodiment.

The above-described at least one embodiment can enhance the system performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tiered storage system comprising:
   a first storage device which comprises a storage area including a plurality of physical chunks having a first size;
   a second storage device which comprises a storage area including a plurality of physical chunks having the first size, the second storage device having a lower access speed and a larger storage capacity than the first storage device; and
   a storage controller which controls the first and second storage devices, wherein:
   the storage controller comprises a logical volume management unit, an access statistics collection controller, an evaluation controller, an evaluation value calculator, and a relocation controller;
   the logical volume management unit manages a logical volume including a plurality of logical chunks having the first size, the logical volume being provided to a host computer, the storage areas of the first and second storage devices being allocated to the logical volume physical chunk by physical chunk;
   the access statistics collection controller collects, during respective monitoring periods, access frequency statistical values representing statuses of accesses to the respective logical chunks;
   the evaluation controller records a first access frequency statistical value and a second access frequency statistical value associated with a respective one of the logical chunks, the first access frequency statistical value representing a status of access to the respective one of the logical chunks which is in a first location state in which data of the respective one of the logical chunks is located on the first storage device, the second access frequency statistical value representing a status of access to the respective one of the logical chunks which is in a second location state in which data of the respective one of the logical chunks is located on the second storage device;
   the evaluation controller updates, during the respective monitoring periods, the first or second access frequency statistical value corresponding to a location state of data of the respective one of the logical chunks such that the first access frequency statistical value indicates an access frequency statistical value recorded during a most recent monitoring period in which the data of the respective one of the logical chunks is in the first location state and the second access frequency statistical value indicates an access frequency statistical value recorded during a most recent monitoring period in which the data of the respective one of the logical chunks is in the second location state, based on one of the collected access frequency statistical values, which is associated with the respective one of the logical chunks;
   the evaluation value calculator calculates an evaluation value based on the first and second access frequency statistical values of the respective one of the logical chunks, the evaluation value indicative of a degree of improvement of access performance obtained when the location state of the data of the respective one of the logical chunks is changed from the second location state to the first location state; and the relocation controller determines whether it is necessary to change the location state of the data of the respective one of the logical chunks, based on the evaluation value of the respective logical chunks.

2. The tiered storage system of claim 1, wherein the evaluation value of the respective one of the logical chunks is a ratio between the first and second access frequency statistical values of the respective one of the logical chunks.

3. The tiered storage system of claim 1, wherein the evaluation value of the respective one of the logical chunks is a difference between the first and second access frequency statistical values of the respective one of the logical chunks.

4. The tiered storage system of claim 1, wherein the evaluation value of the respective one of the logical chunks is a product of a ratio between the first and second access frequency statistical values of the respective one of the logical chunks, and the first access frequency statistical value.

5. The tiered storage system of claim 1, wherein:
the logical volume management unit manages, using mapping data, a correspondence between a logical address of the respective one of the logical chunks and a physical address of a physical chunk of the first or second storage device allocated to the respective one of the logical chunks; and
the evaluation controller identifies, using the mapping data, the location state of the data of the respective one of the logical chunks, based on the physical address associated with the logical address or the respective one of the logical chunks.

6. The tiered storage system of claim 5, wherein:
the evaluation controller records the evaluation value of the respective one of the logical chunks in an evaluation value list, in association with at least the logical address of the respective one of the logical chunks;
the relocation controller sequentially selects first evaluation values of first logical chunks whose data is in the first location state in a most recent monitoring period, from the evaluation value list in ascending order of the first evaluation values, and sequentially selects second evaluation values of second logical chunks whose data is in the second location state in the most recent monitoring period, from the evaluation value list in descending order of the second evaluation values; and
when having selected one of the first evaluation values and one of the second evaluation values, the relocation controller determines whether it is necessary to change the location state of data of a first logical chunk indicated by a first logical address associated with the selected first evaluation value, and the location state of data of a second logical chunk indicated by a second logical address associated with the selected second evaluation value, based on whether or not the selected second evaluation value is greater than the selected first evaluation value.

7. The tiered storage system of claim 6, wherein when having determined that it is not necessary to change the location state, the relocation controller stops selection of a subsequent first evaluation value and a subsequent second evaluation value.

8. The tiered storage system of claim 6, wherein:
the evaluation value list includes a first evaluation value list and a second evaluation value list;

the evaluation controller records, in the first evaluation value list, a first element including a combination of a first evaluation value of a respective one of the first logical chunks whose data is in the first location state in the most recent monitoring period, and a first logical address of the respective one of the first logical chunks;

the evaluation controller records, in the second evaluation value list, a second element including a combination of a second evaluation value of a respective one of the second logical chunks whose data is in the second location state in the most recent monitoring period, and a second logical address of the respective one of the second logical chunks;

the relocation controller sequentially selects the first evaluation values from the first evaluation value list in ascending order of the first evaluation values; and the relocation controller sequentially selects the second evaluation values from the second evaluation value list in descending order of the second evaluation values.

9. A storage controller which controls a first storage device and a second storage device included in a tiered storage system, the first storage device comprising a storage area which includes a plurality of physical chunks having a first size, the second storage device comprising a storage area which includes a plurality of physical chunks having the first size, the second storage device having a lower access speed and a larger storage capacity than the first storage device, the storage controller comprising:

a logical volume management unit which manages a logical volume including a plurality of logical chunks having the first size, the logical volume being provided to a host computer, the storage areas of the first and second storage devices being allocated to the logical volume physical, chunk by physical chunk;

an access statistics collection controller which collects, during respective monitoring periods, access frequency statistical values representing statuses of accesses to the respective logical chunks;

an evaluation controller which records a first access frequency statistical value and a second access frequency statistical value associated with a respective one of the logical chunks, the first access frequency statistical value representing a status of access to the respective one of the logical chunks which is in a first location state in which data of the respective one of the logical chunks is located on the first storage device, the second access frequency statistical value representing a status of access to the respective one of the logical chunks which is in a second location state in which data of the respective one of the logical chunks is located on the second storage device, the evaluation controller updating, during the respective monitoring periods, the first or second access frequency statistical value corresponding to a location state of data of the respective one of the logical chunks such that the first access frequency statistical value indicates an access frequency statistical value recorded during a most recent monitoring period in which the data of the respective one of the logical chunks is in the first location state and the second access frequency statistical value indicates an access frequency statistical value recorded during a most recent monitoring period in which the data of the respective one of the logical chunks is in the second location state, based on one of the collected access frequency statistical values, which is associated with the respective one of the logical chunks;

an evaluation value calculator which calculates an evaluation value based on the first and second access frequency statistical values of the respective one of the logical chunks, the evaluation value indicative of a degree of improvement of access performance obtained when the location state of the data of the respective one of the logical chunks is changed from the second location state to the first location state; and a relocation controller which determines whether it is necessary to change the location state of the data of the respective one of the logical chunks, based on the evaluation value of the respective logical chunks.

10. The storage controller of claim 9, wherein:

the logical volume management unit manages, using mapping data, a correspondence between a logical address of the respective one of the logical chunks and a physical address of a physical chunk of the first or second storage device allocated to the respective one of the logical chunks; and the evaluation controller identifies, using the mapping data, the location state of the data of the respective one of the logical chunks, based on the physical address associated with the logical address of the respective one of the logical chunks.

11. The storage controller of claim 10, wherein:

the evaluation controller records the evaluation value of the respective one of the logical chunks in an evaluation value list, in association with at least the logical address of the respective one of the logical chunks;

the relocation controller sequentially selects first evaluation values of first logical chunks whose data is in the first location state in a most recent monitoring period, from the evaluation value list in ascending order of the first evaluation values, and sequentially selects second evaluation values of second logical chunks whose data is in the second location state in the most recent monitoring period, from the evaluation value list in descending order of the second evaluation values; and when having selected one of the first evaluation values and one of the second evaluation values, the relocation controller determines whether it is necessary to change the location state of data of a first logical chunk indicated by a first logical address associated with the selected first evaluation value, and the location state of data of a second logical chunk indicated by a second logical address associated with the selected second evaluation value, based on whether or not the selected first evaluation value is greater than the selected second evaluation value.

12. The storage controller of claim 11, wherein when having determined that it is not necessary to change the location state, the relocation controller stops selection of a subsequent first evaluation value and a subsequent second evaluation value.

13. The storage controller of claim 11, wherein:

the evaluation value list includes a first evaluation value list and a second evaluation value list;

the evaluation controller records, in the first evaluation value list, a first element including a combination of a first evaluation value of a respective one of the first logical chunks whose data is in the first location state in the most recent monitoring period, and a first logical address of the respective one of the first logical chunks;

the evaluation controller records, in the second evaluation value list, a second element including a combination of a second evaluation value of a respective one of the second logical chunks whose data is in the second location state in the most recent monitoring period, and a second logical address of the respective one of the second logical chunks;

the relocation controller sequentially selects the first evaluation values from the first evaluation value list in descending order of the first evaluation values; and the relocation controller sequentially selects the second evaluation values from the second, evaluation value list in descending order of the second evaluation values.

14. A method, in a storage controller which controls a first storage device and a second storage device, for estimating data location, the first storage device comprising a storage area which includes a plurality of physical chunks having a first size, the second storage device comprising a storage area which includes a plurality of physical chunks having the first size, the second storage device having a lower access speed and a larger storage capacity than the first storage device, the method comprising:

managing a logical volume including a plurality of logical chunks having the first size, the logical volume being provided to a host computer, the storage areas of the first and second storage devices being allocated to the logical volume physical chunk by physical chunk;

collecting, during respective monitoring periods, access frequency statistical values representing statuses of access to the respective logical chunks;

recording a first access frequency statistical value and a second access frequency statistical value associated with a respective one of the logical chunks, the first access frequency statistical value representing a status of access to the respective one of the logical chunks which is in a first location state in which data of the respective one of the logical chunks is located on the first storage device, the second access frequency statistical value representing a status of access to the respective one of the logical chunks which is in a second location state in which data of the respective one of the logical chunks is located on the second storage device;

updating, during the respective monitoring periods, the first or second access frequency statistical value corresponding to a location state of data of the respective one of the logical chunks such that the first access frequency statistical value indicates an access frequency statistical value recorded during a most recent monitoring period in which the data of the respective one of the logical chunks is in the first location state and the second access frequency statistical value indicates an access frequency statistical value recorded during a most recent monitoring period in which the data of the respective one of the logical chunks is in the second location state, based on one of the collected access frequency statistical values, which is associated with the respective one of the logical chunks;

calculating an evaluation value based on the first and second access frequency statistical values of the respective one of the logical chunks, the evaluation value indicative of a degree of improvement of access performance obtained when the location state of the data of the respective one of the logical chunks is changed from the second location state to the first location state; and determining whether it is necessary to change the location state of the data of the respective one of the logical chunks, based on the evaluation value of the respective logical chunks.

15. The method of claim 14, further comprising:

managing, using mapping data, a correspondence between a logical address of the respective one of the logical chunks and a physical address of a physical chunk of the first or second storage device allocated to the respective one of the logical chunks; and identifying, using the mapping data, the location state of the data of the respective one of the logical chunks, based on the physical address associated with the logical address of the respective one of the logical chunks.

16. The method of claim 15, further comprising:

recording the evaluation value of the respective one of the logical chunks in an evaluation value list, in association with at least the logical address of the respective one of the logical chunks; and sequentially selecting first, evaluation values of first logical chunks whose data is in the first location state in a most recent monitoring period, from the evaluation value list in ascending order of the first evaluation values, and sequentially selecting second evaluation values of second logical chunks whose data is in the second location state in the most recent monitoring period, from the evaluation value list in descending order of the second evaluation values, wherein determining whether it is necessary to change the location state further includes determining, when one of the first evaluation values and one of the second evaluation values are selected, whether it is necessary to change the location state of data of a first logical chunk indicated by a first logical address associated with the selected first evaluation value, and the location state of data of a second logical chunk indicated by a second logical address associated with the selected second evaluation value, based on whether or not the selected first evaluation value is greater than the selected second evaluation value.

17. The method of claim 16, further comprising stopping selection of a subsequent first evaluation value and a subsequent second evaluation value when it is determined that it is not necessary to change the location state.

* * * * *